United States Patent [19]

Tatkov et al.

[11] 4,101,243
[45] Jul. 18, 1978

[54] CENTRIFUGAL TWO-STAGE PUMP

[75] Inventors: Viktor Arsentievich Tatkov; Petr Ipatovich Jurin; Gennady Ivanovich Bondarev; Mikhail Andreevich Koryagin, all of Novokuznetsk Kemerovskoi oblasti, U.S.S.R.

[73] Assignee: Vsesohuzny nauchno-issledovatelsku I Proktno-Konstruk torsky institut. Dobychi Uglya Grdravlicheskin Sposobom "Vnllgidrougal", Novokuznetsk Kemerovskoi oblasti, U.S.S.R.

[21] Appl. No.: 661,047

[22] Filed: Feb. 24, 1976

[30] Foreign Application Priority Data

Feb. 28, 1975 [SU] U.S.S.R. ............... 2106103

[51] Int. Cl.² ............................. F01D 25/24
[52] U.S. Cl. .................... 415/201; 285/367; 403/338; 415/198.1; 415/219 C; 417/407
[58] Field of Search .............. 415/97, 98, 99, 105, 415/198, 219 C, 199 R; 417/360, 407; 403/338, 335, 336; 285/367

[56] References Cited

U.S. PATENT DOCUMENTS

| | | | |
|---|---|---|---|
| 2,486,731 | 11/1949 | Buchi | 415/201 |
| 2,864,552 | 12/1958 | Anderson | 417/360 |
| 3,010,697 | 11/1961 | Lazo et al. | 415/201 |
| 3,034,443 | 5/1962 | Hinrichs et al. | 417/360 |
| 3,734,650 | 5/1973 | Reisacher et al. | 417/407 |
| 3,740,170 | 6/1973 | Miller | 417/407 |
| 3,969,804 | 7/1976 | MacInnes et al. | 417/407 |

FOREIGN PATENT DOCUMENTS

| | | | |
|---|---|---|---|
| 511,690 | 5/1952 | Belgium | 415/219 R |
| 186,289 | 10/1966 | U.S.S.R. | 415/201 |

Primary Examiner—C. J. Husar
Attorney, Agent, or Firm—Haseltine, Lake & Waters

[57] ABSTRACT

A pump wherein the parts of the casing forming, together with the partitions and sealing members, chambers for the accommodation of impellers mounted in a counteropposed manner on a shaft, are interconnected in the plane perpendicular to the rotation axis of the impellers by a clamp. The clamp consists of two parts with the joining plane passing through the rotation axis of the impellers and the clamp has circular collars at the edges, the collars entering circular recesses provided in flanges located on the opposite sides of the casing parts. The clamp is adapted for compressing the sealing members while the clamp parts are being brought together.

6 Claims, 3 Drawing Figures

CENTRIFUGAL TWO-STAGE PUMP

FIELD OF THE INVENTION

The present invention relates to centrifugal pumps and more particularly, to centrifugal two-stage pumps.

The centrifugal two-stage pump according to the present invention will be most beneficial for hydraulic hoisting and conveyance of coal hydraulically extracted from pits and quarries.

The pump according to the invention can also be employed in other industries where hydraulic conveyance of bulk materials is involved.

PRIOR ART

Known in the prior art are centrifugal two-stage pumps wherein impellers mounted on the shaft in an opposed manner are accommodated in the discharge chambers. Each discharge chamber is formed by a part of the casing which is provided with a suction channel at one side, and a partition located at the opposite side.

This partition separates one chamber from the other and has a hole for the passage of the shaft. Located in this hole is a plastic sliding-friction bearing which is lubricated by the handled fluid. The other bearing is located on the end of the shaft at the side of the drive coupling.

The parts of the casing forming the discharge chambers are interconnected in a plane perpendicular to the rotation axis of the impellers by means of a dismountable housing which fits around these parts of the casing and simultaneously seals the discharge chambers. The joint of the housing also lies in the plane perpendicular to the rotation axis of the impellers. Both parts of the housing are connected along the joint by a plurality of bolts.

The employment of the above-described centrifugal pumps for handling fluids with abrasive inclusions is characterized by a comparatively rapid wear of the impellers and of the casing parts forming the discharge chambers. In the course of operation the impellers and these parts of the casing have to be rather frequently replaced. This replacement calls for loosening all the bolts which connect the housing parts, removing one part of the housing then one part of the casing, taking the low-stage impeller off the shaft and removing the partitions after which the shaft can be taken out complete with the other impeller. The other part of the casing can be taken out only after the completion of all the above operations.

The above-mentioned operations take considerable time which raises operating expenditures and decreases the profitableness of hydraulic transportation.

SUMMARY OF THE INVENTION

An object of the present invention is to provide a centrifugal two-stage pump wherein the parts of the casing which form the impeller chambers are connected in such a manner as to allow said parts to be disconnected and reconnected comparatively quickly for replacing these parts and the worn impellers.

In accordance with these and other objects we hereby provide a centrifugal two-stage pump in which the parts of the casing which, together with the partitions and sealing members, form chambers for the accommodation of impellers mounted in an opposed manner on the shaft, are interconnected in a plane perpendicular to the rotation axis of said impellers. According to the invention, the parts of the casing are interconnected by a clamp consisting of two parts joined along a plane passing practically through the rotation axis of the impellers, said clamp being provided at the edges with circular collars directed to the rotation axis of the impellers, while the opposite sides of the casing parts have flanges with circular grooves to receive the circular collars of the clamp which is adapted for compressing the sealing members while the clamp parts are being brought together.

It is practicable that the inner surface of the clamp, substantially in the middle, should be provided with a tapered circular collar and that there should be a circular gap between the partitions to accommodate said collar while the parts of the clamp are being brought together.

Such a design of the clamp will serve both for connection of the casing parts and reliable sealing of the impeller chambers.

It is no less practicable that one of the clamp parts should be connected with the parts of the pump casing accommodating the bearings of the impeller shaft.

This design of one of the clamp parts will speed up the process of pump assembly during replacement of the worn parts, simultaneously increasing the rigidity of the pump design.

The centrifugal two-stage pump realized according to the present invention gives a considerable saving in the time spent for disassembly and assembly of the pump in the course of current repairs. This becomes particularly important when the centrifugal pumps are employed in mines for the hydraulic conveyance of granulated abrasive materials.

BRIEF DESCRIPTION OF THE DRAWINGS

Now the invention will be described in detail by way of example with reference to the accompanying drawings, in which.

DETAILED DESCRIPTION

Figure 1:
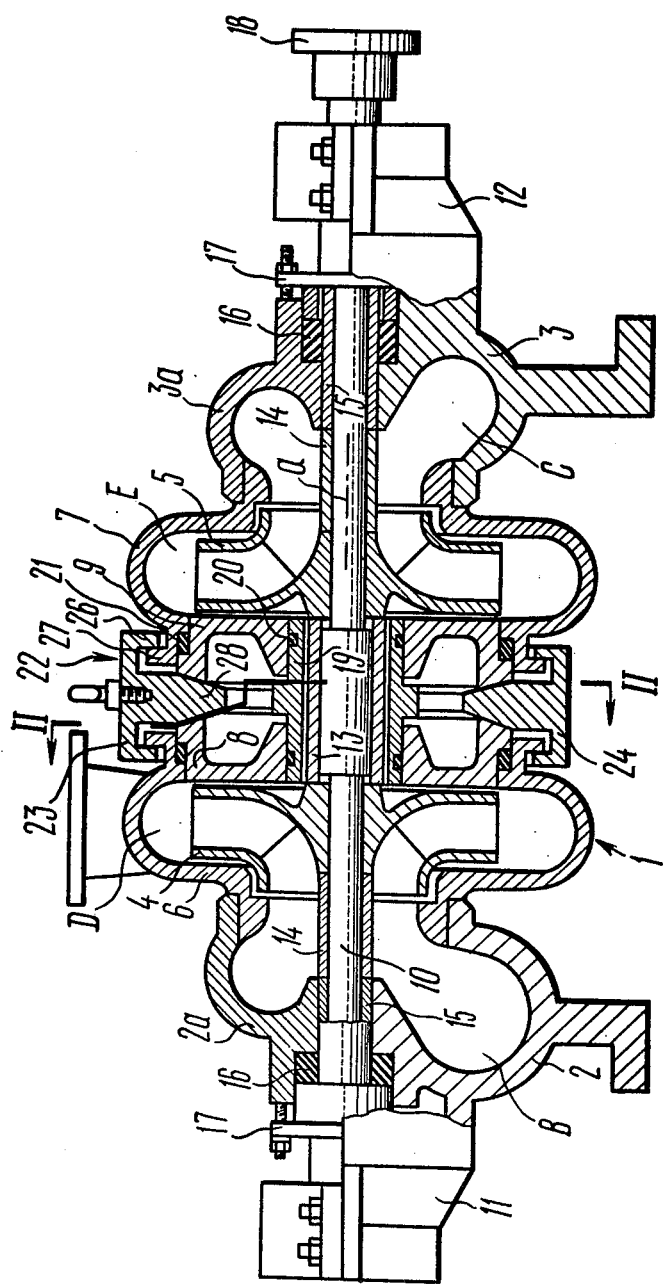
FIG. 1 illustrates a centrifugal two-stage pump according to the invention with a partial cutout along the vertical plane passing through the axis of the rotation of pump impellers.

The centrifugal two-stage pump comprises a casing 1 (FIG. 1) made up of interconnected parts 2 and 2a, 3 and 3a which form the suction spaces "B" and "C", respectively which deliver the flow of liquid into the low- and high-pressure stages, respectively. Each of these casing parts is dismountable, the joining plane passing horizontally along the rotation axis "a" of impellers 4 and 5. The parts 2, 2a and 3, 3a adjoin, correspondingly, the parts 6 and 7 of the casing 1 which, together with the partitions 8 and 9, form chambers "D" and "E" accommodating the impellers 4 and 5, respectively. The impellers 4, 5 are mounted in an opposed manner on a shaft 10. The shaft 10 is installed in bearings (not shown in the drawing) which are secured in the cantilever members 11, 12 of the parts 2 and 3 of the casing 1. The shaft 10 is mounted with a spacer bushing 13 between the impellers 4, 5 while at the opposite sides of each impeller 4, 5 the shaft 10 is fitted with spacer bushings 14, 15 intended to prevent axial displacement of the impellers 4, 5.

On both sides of the casing 1 the shaft 10 is sealed by glands 16 pressed by main bushes 17.

The free end of the shaft 10 carries a coupling member 18 provided for connecting the shaft 10 with the drive motor shaft (not shown in the drawing).

Partitions 8 and 9 are installed on a bushing 19 which is slipped on the shaft 10 so as to form a gap between the spacer bushing 13 of the shaft 10 and the bushing 19, said gap serving as a slot-type seal. Between the bushing 19 and the partitions 8 and 9 are located sealing members 20 while sealing members 21 are located between the partitions 8 and 9 and the casing parts 6 and 7.

The parts 6 and 7 of the casing 1 are interconnected in a plane perpendicular to the rotation axis of the impellers 4, 5 by means of a clamp 22. The clamp 22 consists of an upper part 23 and a lower part 24. Said parts are joined in a plane passing through the rotation axis "a" of the impellers 4, 5 and are connected to each other by bolts 25 (FIG. 2), one bolt at each side. The clamp 22 has circular collars 26 (FIG. 1) at the edges, said collars being directed towards the axis "a". The opposite sides of the parts 6 and 7 of the casing 1 have flanges 27 provided with circular grooves to receive circular collars 26.

The inner surface of the clamp 22, practically in the middle, has a tapered circular collar 28. This collar enters the gap between the partitions 8 and 9, the shape of this gap following that of the circular collar 28. The circular collar 28 serves for compressing the sealing members 21 when the parts 23, 24 of the clamp 22 are being brought together which ensures reliable sealing of the chambers "D" and "E".

Figure 3:
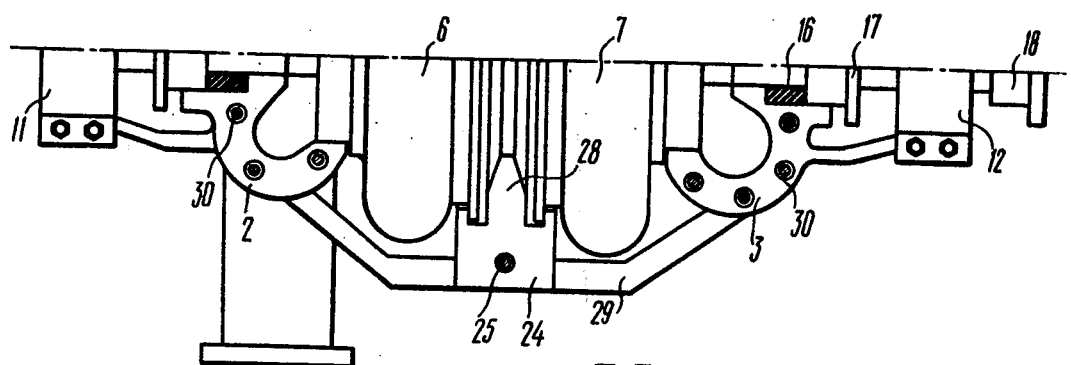
FIG. 3 is a view along arrow A in FIG. 2 towards the shaft axis with the upper part of the clamp removed and with open suction spaces for the low- and high-pressure stages.

The casing parts 2 and 3 are interconnected by beams 29 (FIG. 3) which, together with said parts, form the pump frame adapted for securing the pump to the bedplate. The part 24 of the clamp 22 is rigidly secured to the beam 29. This connection of the parts 2, 3 of the casing 1 and of the lower part 24 of the clamp 22 provides for the requisite rigidity of the pump construction and reduces the time required for installing the shaft 10 complete with the impellers 4, 5 and chambers "D" and "E" on the pump frame.

Figure 2:
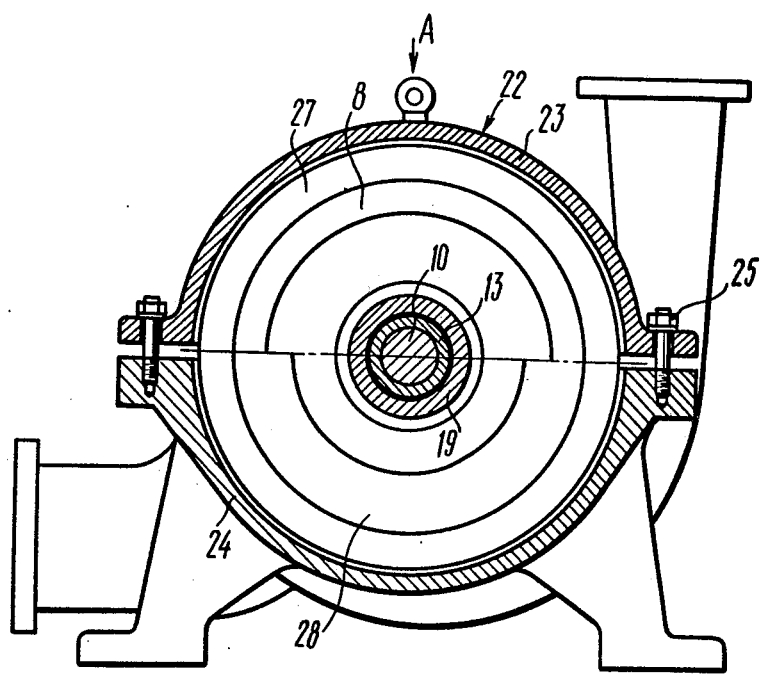
FIG. 2 is a section taken along line II—II in FIG. 1.

After the replacement of the worn impellers 4, 5 the pump is assembled as follows. The shaft 10 together with the impellers 4, 5, parts 6 and 7 of the casing 1 and partitions 8 and 9 is mounted on bearings in the cantilever members 11, 12 of the parts 2 and 3 of the casing 1. Simultaneously, the circular collar of the lower part 24 of the clamp enters the gap between the partitions 8 and 9 while the recesses in the flanges 27 of the casing parts 6 and 7 engage the collars 26 of the lower part of the clamp 22. In this way the parts 6, 7 of the casing 1 are secured in the required position on the pump frame. Then the upper part 23 of the clamp 22 is put in place so that its collars 26 enter the recesses in the flanges 27 of the parts 6 and 7 of the casing 1. Simultaneously, the circular collar 28 enters the gap between the partitions 8 and 9 and forces them apart, compressing the sealing members 21. Then the parts 23, 24 of the clamp 22 are clamped together with bolts 25 (FIG. 2).

Now the detachable parts 2 and 2a, 3 and 3a are fixed together with bolts 30.

The disassembly of the pump is carried out by reversing the assembly operations.

The centrifugal two-stage pump realized according to the present invention functions on similar lines with the known pumps of this type.

An experimental model of the two-stage centrifugal pump realized according to the present invention is now undergoing industrial tests in one of the mines of the Soviet Union. These tests have shown so far that the design of the pump according to the invention makes it possible to quickly replace the worn units and parts of the pump and to ensure reliable sealing of the impeller chamber.

What we claim is:

1. A two-stage centrifugal pump comprising:
   (a) a hollow, elongated casing having a longitudinal axis and including a pair of axially spaced sections each of which comprises a plurality of releasably connected parts so that said casing is dismountable, said sections having confronting flanges provided with recesses;
   (b) a pair of axially spaced partitions respectively cooperating with said sections in the regions of said flanges to define a pair of chambers interiorly of said casing;
   (c) sealing members between said casing and said partitions for sealing said chambers;
   (d) a shaft in said casing mounted for rotation on said axis;
   (e) a pair of impellers mounted on said shaft for rotation therewith and each arranged in one of said chambers; and
   (f) a clamp for connecting said sections arranged between the latter, said clamp including a pair of releasably connected portions joined along a plane which substantially passes through said axis so as to permit rapid disassembly of said pump, and said clamp being provided with collars which are received in said recesses, said clamp having an inwardly directed projection positioned between said partitions and operative for exerting pressure on the latter and thereby causing compression of said sealing members upon assembly of said clamp.

2. A centrifugal pump according to claim 1 wherein said partitions are normal to said axis, said collars being of annular configuration and said recesses being circular.

3. A centrifugal pump according to claim 1 wherein said projection is tapered and is of annular configuration.

4. A centrifugal pump according to claim 3 wherein said partitions have surfaces in engagement with said projection and said surfaces are tapered in conformance with the taper of said projection.

5. A centrifugal pump according to claim 1 wherein said projection is centered on said clamp.

6. A centrifugal pump according to claim 1 comprising a pair of bearings for said shaft each of which is accommodated in a different one of said parts of said casing, one of said portions of said clamp being rigidly connected with the respective parts of said casing which accommodate said bearings.

* * * * *